WILLIAM M. LEWIS, JR.,
INVENTOR.

BY HIS ATTORNEYS.
Spensley & Horn.

April 13, 1965 W. M. LEWIS, JR 3,178,553
AUTOMATIC SEAMWELDER
Filed April 23, 1962 5 Sheets-Sheet 2

INVENTOR.
WILLIAM M. LEWIS, JR.,
BY HIS ATTORNEYS.
Spensley & Horn

WILLIAM M. LEWIS, JR.,
INVENTOR.

BY HIS ATTORNEYS.

Spensley & Horn.

AUTOMATIC SEAMWELDER

Filed April 23, 1962

5 Sheets-Sheet 4

WILLIAM M. LEWIS, JR.,
INVENTOR.

BY HIS ATTORNEYS.

Spensley & Horn.

WILLIAM M. LEWIS, JR.,
INVENTOR.

BY HIS ATTORNEYS

Spensley & Horn.

United States Patent Office 3,178,553
Patented Apr. 13, 1965

3,178,553
AUTOMATIC SEAMWELDER

William Mitchell Lewis, Jr., Monterey Park, Calif., assignor to TRW Semiconductors, Inc., Lawndale, Calif., a corporation of Delaware Filed Apr. 23, 1962, Ser. No. 189,461
9 Claims. (Cl. 219—81)

This invention relates to a semiconductor assembly apparatus and more particularly to an automatic seamwelding apparatus for hermetically sealing metal pin electrodes to encapsulating envelopes of electronic components such as semiconductor devices.

In the production of semiconductor devices, such as semiconductor diodes, one presently preferred means of encapsulating the semiconductor device is through utilization of a glass cylinder into each end of which is inserted a metal shell. The glass cylinder and the metal shells are mateable and are fused together to form a hermetic seal, the resulting assembly being called a fused body subassembly. The semiconductor device body is mounted to one end of an elongate, cylindrical metal plug which is inserted into one of the shells to position the device body within the glass cylinder. A similar elongate metal plug, having a cat whisker electrode wire mounted to its end, is inserted into the shell at the other end of the glass cylinder. The metal shells are sealed to the metal plugs, typically by soldering or cementing, and the metal plugs function as electrode pins. Such device structures are shown and described in U.S. Patent No. 2,815,474, entitled "Glass Sealed Semiconductor Rectifier," by William M. Lewis, Jr., and Henry D. Frazier, issued December 3, 1957, and in U.S. Patent No. 2,881,369, entitled "Glass Sealed Crystal Rectifier," by Justice N. Carmen, Jr., issued April 7, 1959, both of these patents being assigned to the assignee of the present invention.

It is very important that the semiconductor crystal body be hermetically sealed within the fused body subassembly to provide protection from chemical contamination and to insure consistent operation and long life. Prior to the present invention, the seal between the shells and the metal plugs were usually formed either by cementing or soldering techniques. However, cementing techniques cannot be relied upon to consistently produce hermetic seals, and suffer from the further disadvantage that the seal is degraded at elevated temperatures. Hence, a low production yield and a temperature limitation upon the use of the semiconductor device are two undesirable characteristics associated with use of cementing techniques to seal the metal plugs within the shells. Although the use of solder instead of a cement will result in more reliable sealing, due to the relatively low melting point of solders there is still present a temperature limitation upon operation of the semiconductor device. Moreover, sputtering of the solder frequently causes contamination of the semiconductor crystal by solder and solder flux. Metals can be joined in consistently reliable hermetic seals by welding. However, welding has not been widely used in the semiconductor encapsulation art because of the extremely small size of the semiconductor packages, the undesirability of subjecting the crystal to temperatures which might be injurious to its crystalline structure, and the general unsuitability of welding processes for use with mass production techniques. Similar considerations apply in the fabrication of other electrical components, both active and passive, using the aforementioned coaxially assembled package. Hence, the present invention is directed toward the use of welding to provide reliable hermetic sealing of electrical component encapsulating structures and will be described with particular reference to the packaging of a semiconductor diode.

Accordingly, it is an object of the present invention to provide improved apparatus for the assemblage of electrical component encapsulating structures.

It is also an object of the present invention to provide welding apparatus suitable for use in the assembly of semiconductor devices.

It is another object of the present invention to provide improved welding apparatus for reliably hermetically sealing metal electrode pins to a semiconductor fused body subassembly.

It is still another object of the present invention to provide automatic seamwelding apparatus for use in the assembling of semiconductor devices.

The present invention apparatus consists generally of a lathe and an electrode carrier assembly, together with associated hydraulic and electrical control systems. The lathe has synchronously rotatable headstock and tailstock collets into which are mounted the electrode pins to be welded to the shells of a fused body subassembly. Mounted to the projecting tip of one of the electrode pins is a cat whisker electrical lead and ohmically bonded to the projecting tip of the other electrode pin is a semiconductor crystal diode body. The fused body subassembly is temporarily preassembled onto one of the pins. The tailstock is advanced toward the headstock until the cat whisker electrode makes physical contact with the surface of the semiconductor crystal mounted on the other pin. The tailstock is then advanced a predetermined distance closer to the headstock to bend the cat whisker lead so that it becomes spring biased against the semiconductor crystal with a predetermined force. At this point, the pin assemblies and the fused body subassembly are being synchronously rotated and maintained in the desired relationship for welding to complete the semiconductor device.

The electrode carrier assembly includes a pair of spaced apart welding electrode wheels disposed generally above a pair of support wheels. The carrier assembly is advanced toward the fused body subassembly to bring the welding electrode wheels and support wheels into contact with the shells at either end of the subassembly. The electrode wheels are urged toward the support wheels by spring pressure to compress the shells inwardly onto the electrode pins. Welding current is applied through the electrode wheels, the shells, the pins and the lathe collets to seamweld the shells to the pins and complete the semiconductor device, one pin and shell being welded at a time.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figure 10:
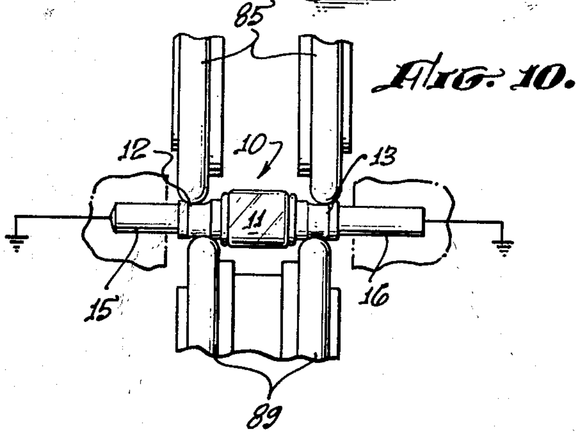
FIGURE 10 is an elevation view showing a semiconductor device positioned between the welding electrode wheels of the seamwelding apparatus.

Referring now to the drawings, and more particularly to FIGURE 10, there is shown a semiconductor fused body subassembly, generally indicated by the reference numeral 10, positioned between the wheels of the automatic seamwelding apparatus of the present invention.

The subassembly 10 includes a central glass cylinder 11 to the ends of which are fused metal shells 12 and 13. The subassembly 10 can be conveniently assembled from the glass cylinder and metal shells by the method and apparatus described in copending U.S. patent applications Serial No. 189,853, entitled "Subassembly Method and Apparatus," by Robert Wullenwaber, filed concurrently herewith, and Serial No. 189,460, entitled "Automatic Feed Fusion Machines," by Alexander Boyd, filed concurrently herewith, both of these patent applications being assigned to the assignee of the present invention. In practice, a typical subassembly 10 is approximately 0.25 inch in length, the outer diameter of the glass cylinder being approximately 0.13 inch. The present invention apparatus is designed to seamweld, in a hermetic seal, metal electrode pins 15 and 16 inserted in the metal shells 12 and 13.

The seamwelding apparatus of the present invention is generally comprised of the combination of a lathe A, a seamwelder B, a hydraulic system C, and an electrical control system D.

Figure 1:
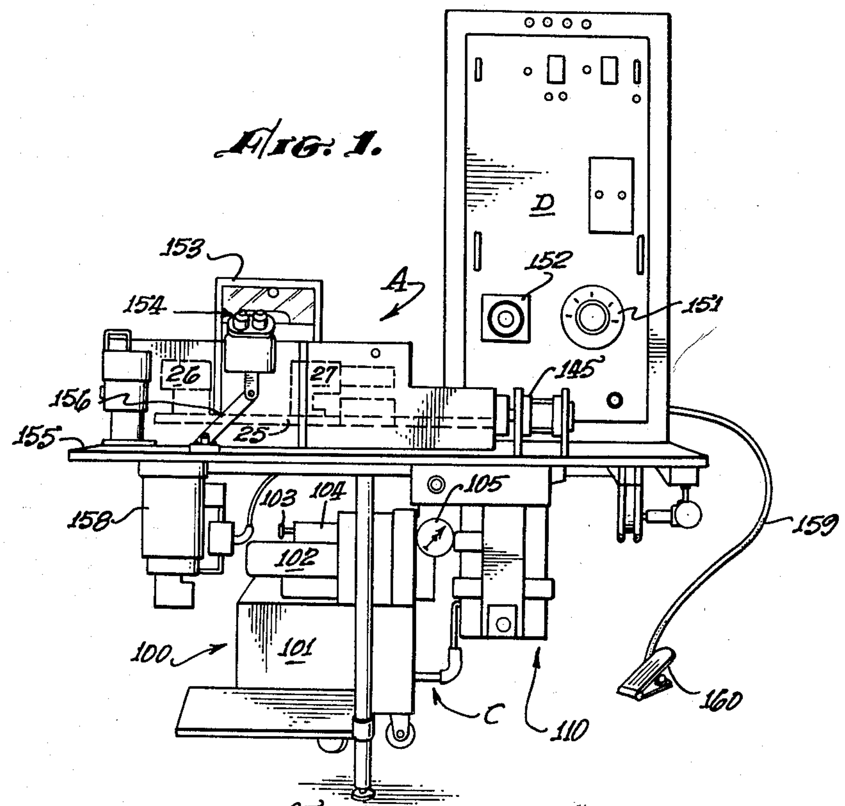
FIGURE 1 is a general pictorial view of the seamwelding apparatus of the present invention.
Figure 2:
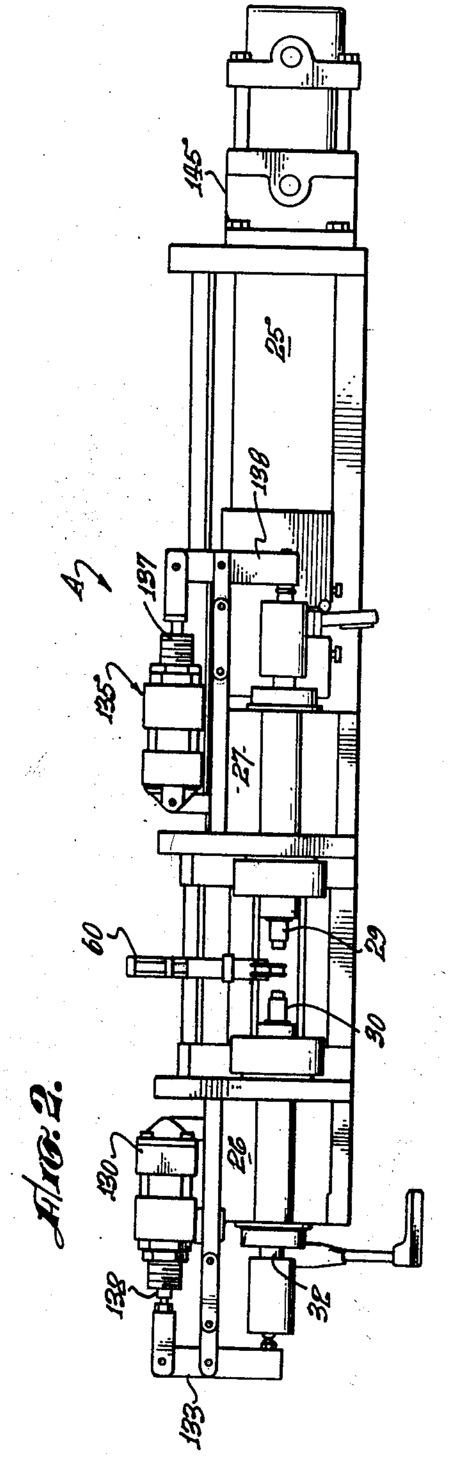
FIGURE 2 is a plan view of a lathe used in the present invention seamwelding apparatus.
Figure 3:
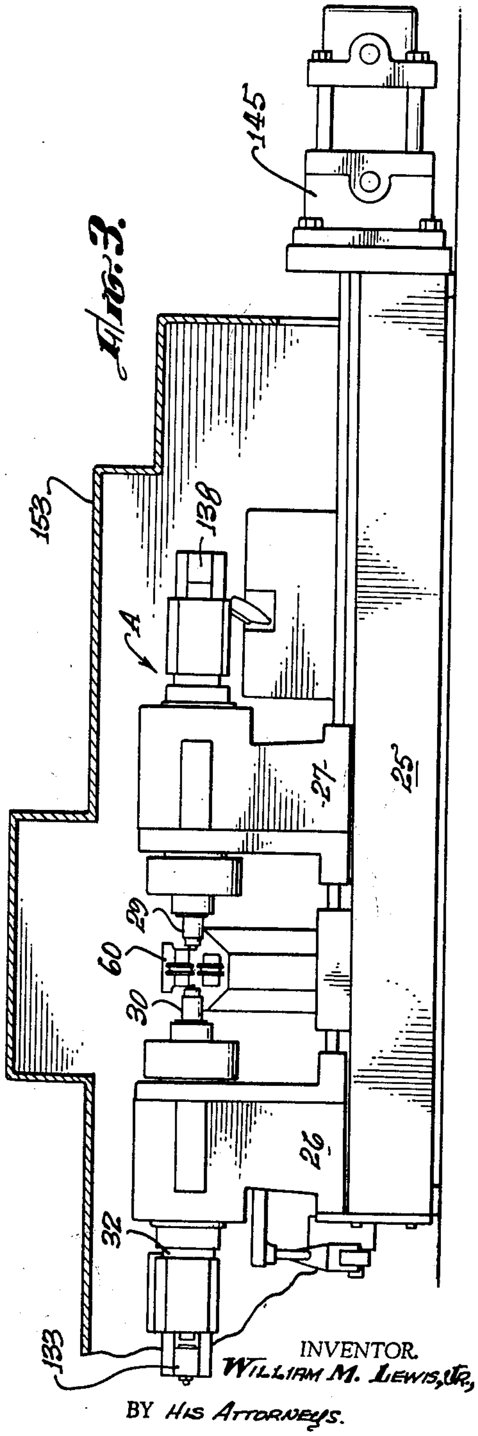
FIGURE 3 is an elevation view of the lathe of FIGURE 2.

Turning now to FIGURES 2 and 3 of the drawing, there are shown plan and elevation views of the lathe A. The lathe includes a bed 25, to which are mounted a headstock 26 and a tailstock 27. Rotatably mounted within the tailstock 27 is a collet 29, and rotatably mounted within the headstock 26 is a collet 30. The collets are synchronously rotated by a lathe motor 158 (see FIGURE 1).

Figure 6:
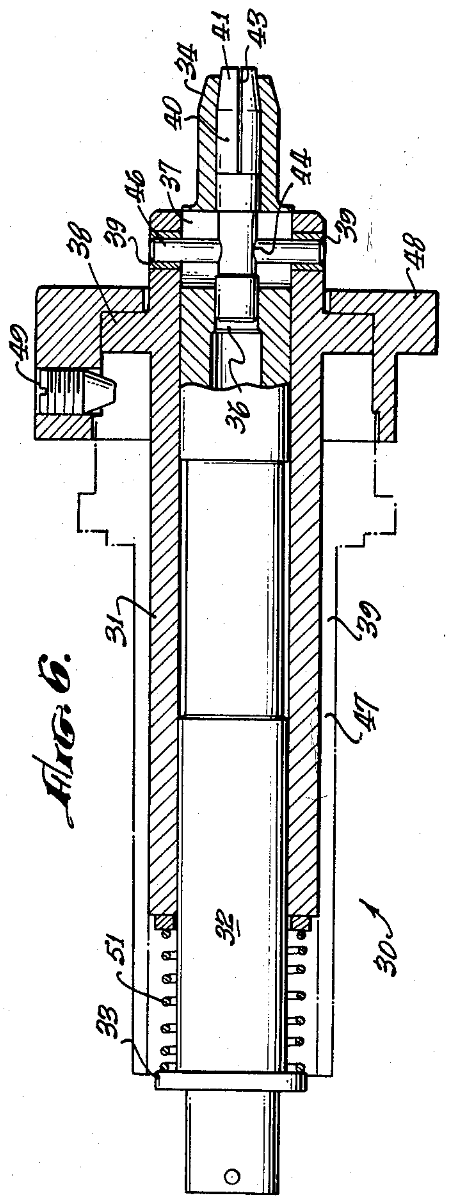
FIGURE 6 is an elevation view, in section, of a collet used in the lathe of FIGURES 2 and 3.
Figure 7:
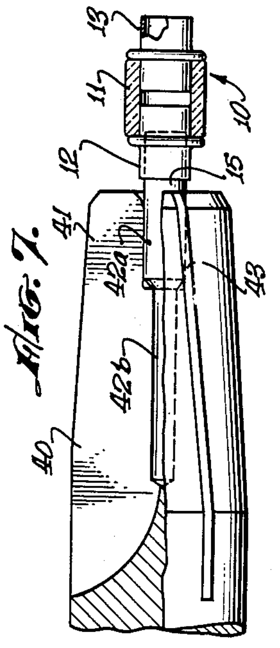
FIGURE 7 is an elevation view of the tip of the collet of FIGURE 6.

The details of the headstock collet 30 are shown in FIGURES 6 and 7 of the drawings. The headstock collet 30 consists generally of a sleeve 31, a rod 32 slidably mounted within the sleeve 31, and a chuck 40. The rod 32 is of circular cross section and has a projecting tapered tip portion 34. A longitudinally extending passageway 36, of circular cross section, extends partially into the rod 32 from the tapered tip portion 34. A longitudinally extending slot 37 passes radially through the rod 32 near the projecting tip portion 34, intersecting the passageway 36.

The chuck 40 is in the form of a cylindrical rod having a tapered tip portion 41. Extending longitudinally into the chuck 40 from the end of the tapered tip portion 41 is an aperture 42, the aperture 42 consisting of a larger diameter portion 42*a* contiguous with a coaxial smaller diameter portion 42*b*. The diameter of the aperture portion 42*a* is substantially equal to the diameter of the electrode pins which are to be seamwelded to the fused body subassembly. The chuck 40 is provided with three, equidistantly spaced, radial slots 43, the slots longitudinally extending throughout the length of the tapered tip portion in the chuck. The chuck 40 is provided with a transverse aperture 44 of circular cross section, the chuck 40 being retained within the tapered tip portion 34 by its taper and by a transverse pin 46 extending through the transverse aperture 44 and through the slot 37 in the rod 32. The tapered tip portion 41 of the chuck extends through the tapered tip portion 34 of the rod 32.

The sleeve 31 is provided with a peripheral flange 38 near one of its ends, and a transverse aperture 39 extending through the sleeve 31 between the flange 38 and the nearby end of the sleeve. The rod 32 and the chuck 40 are contained within the sleeve 31, the rod 32 being slidable within the sleeve and the chuck 40 being rigidly maintained within the sleeve by the pin 46 which extends through the aperture 39 in the sleeve 31.

An elongate bushing 47 is rotatably mounted within the headstock 26, the bushing 47 being indicated in FIGURE 6 by phantom lines. The collet 30 is mounted to the bushing 47 by means of an annular cap 48 which embraces the flange 38 on the sleeve 31, the cap 48 being secured to the bushing 47 by means of a set screw 49.

Normally, the chuck 40 is maintained in the position shown in FIGURE 6 by the force of a helical spring 51, one end of the spring 51 abutting against an end of the sleeve 31 and the other end of the spring 51 abutting against a peripheral flange 33 near the other end of the rod 32. When it is desired to open the jaws of the chuck 40, the rod 32 is urged to the right by a piston rod (not shown) selectively actuated from a source of hydraulic pressure. Upon movement of the rod 32 to the right, the chuck 40 remains motionless with respect to the sleeve 31 since it is pinned thereto by the pin 46, and the tapered tip portion 34 of the rod 32 moves past the projecting tip portion 41 of the chuck 40 to thereby release the radially inwardly directed pressure on the jaws of the chuck and allows the jaws to expand outwardly. The rod 32 can move to the right either until the helical spring 51 is completely compressed or until the surface of the rod 32 defining the left end of the slot 37 abuts against the pin 46. Upon release of the hydraulic pressure, the restoring force of the helical spring 51 causes the rod 32 to be moved to the left until its motion is arrested by the inner surface of the tapered tip portion 34 of the rod 32.

Figures 4, 5:
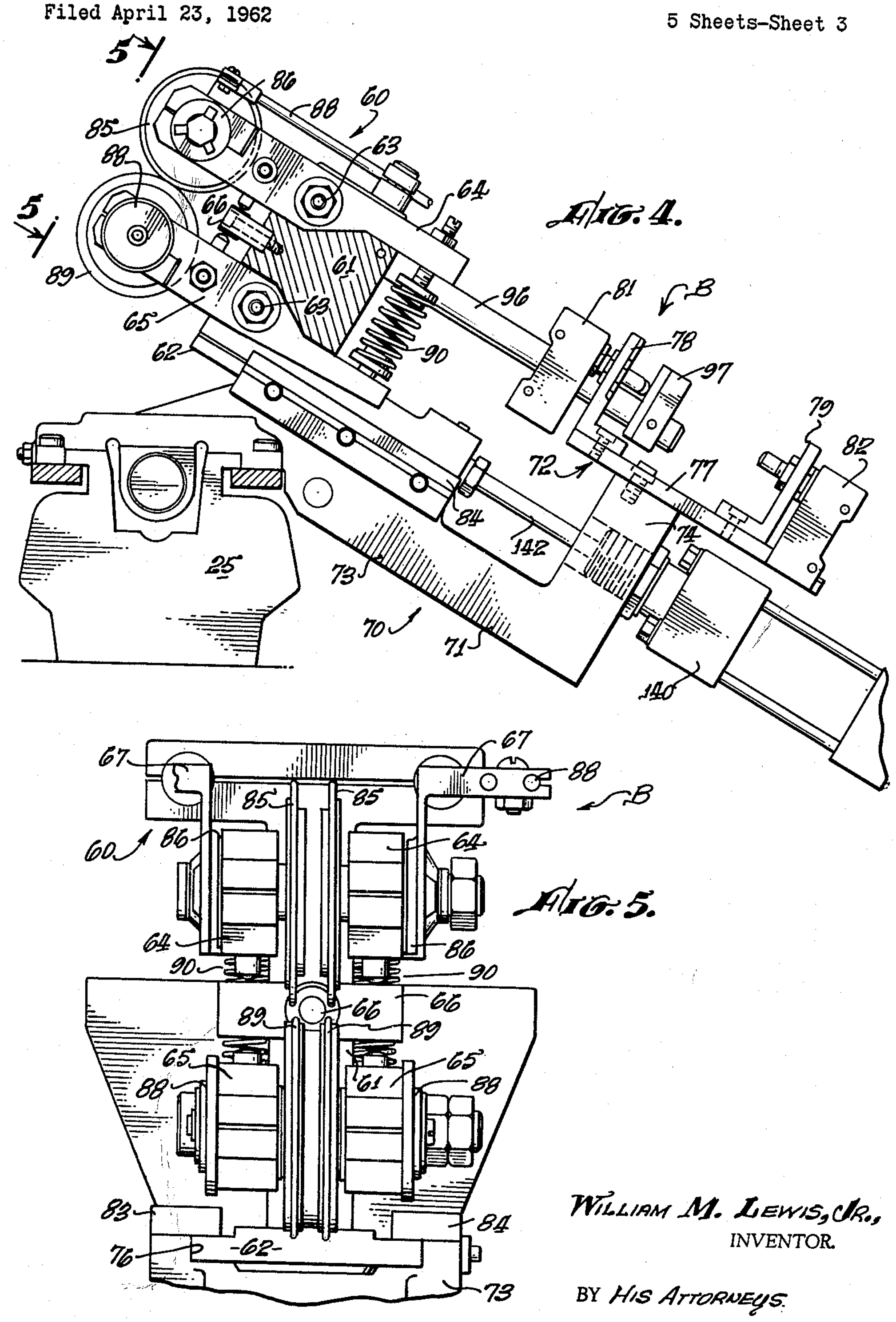
FIGURE 4 is an elevation view showing an electrode carrier assembly of the seamwelding apparatus mounted to the lathe.
FIGURE 5 is a view taken along the line 5—5 of FIGURE 4.

The seamwelder B is energized from an alternating current source, and incorporates welding transformers to provide the low voltage, high current power to the welding electrodes incorporated in an electrode carrier assembly 60. The seamwelder B is shown in detail in FIGURES 4 and 5 of the drawings. The electrode carrier assembly 60 is mounted to the lathe bed 25 by a mounting and positioning assembly 70. The mounting and positioning assembly 70 consists of mounting brackets 71 and 72. The mounting bracket 71 is generally L-shaped, defining an elongate main portion 73 and a projecting end portion 74. The end of the main portion 73 of the mounting bracket 71 is secured to the lathe bed 25, so that the mounting bracket is angularly inclined as shown in FIGURE 4. The uppermost surface of the main portion 73 of the mounting bracket 71 defines an elongate groove 76, of rectangular cross section, extending transversely with respect to the lathe bed 25. The mounting bracket 72 is generally C-shaped, defining a web section 77 extending between flange sections 78 and 79. A microswitch 81 is mounted to the flange section 78 and a microswitch 82 is mounted to the flange section 78, the microswitches 81 and 82 being utilized to control movement of the electrode carrier assembly in a manner to be hereinafter explained.

The structural basis of the electrode carrier assembly 60 is a mounting body 61 having a mounting foot 62 mounted perpendicularly thereto. The mounting foot 62 is of generally rectangular cross section and mateable within the groove 76 in the mounting bracket 71. The mounting body 61 is slidably mounted to the mounting bracket 71 by means of retaining blocks 83 and 84 which function to maintain the mounting foot 62 within the groove 76. Rotatably secured to the mounting body 61, by means of bolts 63, are a first pair of elongate arms 64 and a second pair of elongate arms 65, the arms in each pair being mounted on the opposite sides of the mounting body 61. One end of the arms 64 and 65 extends toward the lathe bed 25 and the other end of the arms 64 and 65 projects away from lathe bed. Rotatably mounted, by means of insulative bushings 86, to the end of each of the arms 64 projecting towards the lathe bed 25 are welding electrode wheels 85. Rotatably mounted, by means of a bushing 88, to the end of each of the arms 65 projecting toward the lathe bed is a support wheel 89. The electrode wheels 85 are maintained in parallel vertical alignment as are the support wheels 89, with the support wheels 89 spaced slightly closer together than the electrode wheels 85. A helical spring 90 is mounted to the ends of the arms 64 and 65 projecting away from the lathe bed, on each side of the mounting body 61, the expansion force of the springs 90 urging the electrode wheels 85 and the supporting wheels 89 toward each other. An adjustable stop 66 is mounted to the mounting body 61 to prevent contact between the electrode wheels 85 and the support wheels 89 below them. An electrode bracket 67 is mounted to each of the insulating bushings 86 and in electrical contact with the associated welding electrode wheel 85. Electrical leads 88 serve to interconnect the welding wheels 85 through the brackets 67 to the source of welding current.

A hydraulic cylinder 140 is mounted to the end portion 74 of the mounting bracket 71, with a piston rod 142 extending therethrough and secured to the mounting foot 62 of the electrode carrier assembly 60. Thus, movement of the piston rod 142, in accordance with the hydraulic pressure within the cylinder 140, causes movement of the electrode carrier assembly 60 along the groove 76 toward and away from the collets of the lathe A. Mounted to the upper end of the mounting body 61 is an elongate rod 96 which extends through a suitable aperture in the flange section 78 of the mounting bracket 72, and slidable therein. Secured to the projecting tip portion of the rod 96 is an actuating cam 97 for actuation of the microswitch 81 at one end of its travel and actuation of the microswitch 82 at the other end of its travel. The microswitches 81 and 82 are wired to electrically control operation of the hydraulic cylinder 140 to automatically determine the limits of electrode carrier assembly travel.

Figure 9:
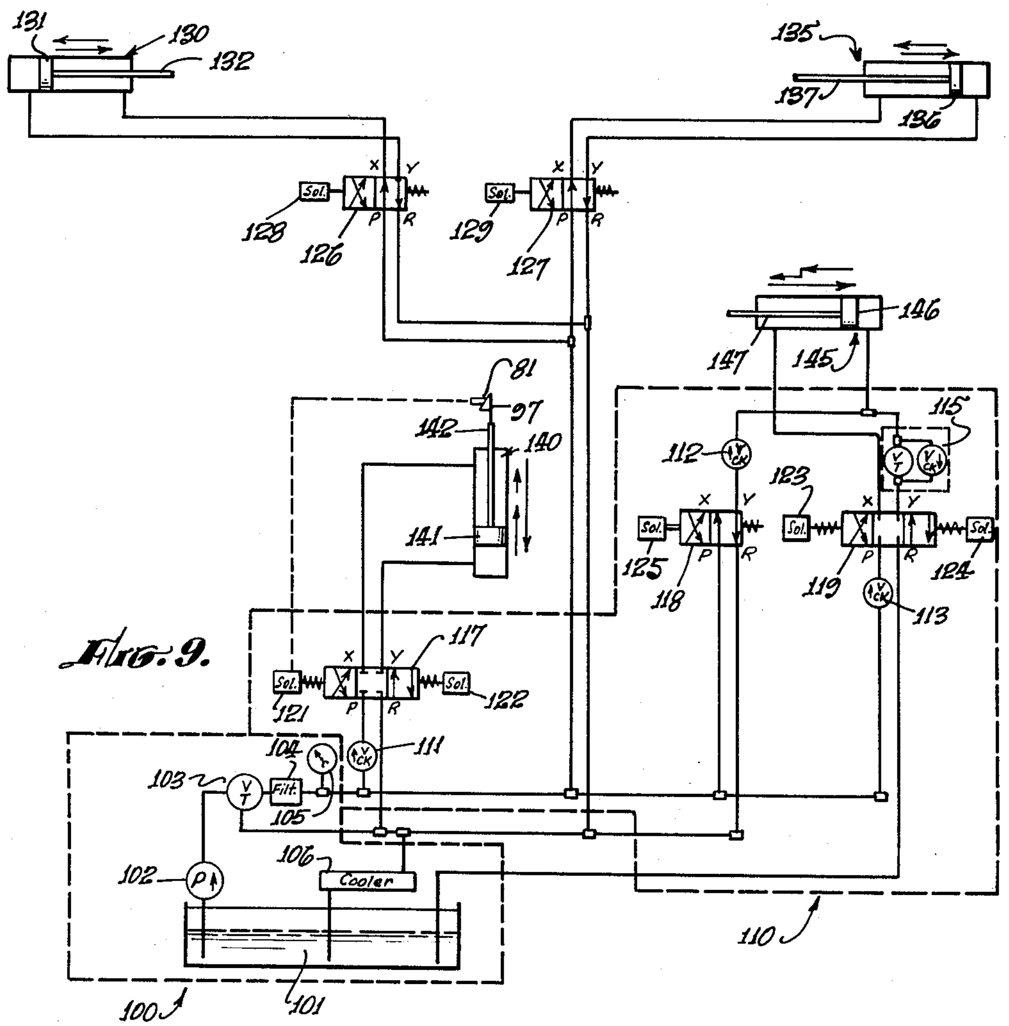
FIGURE 9 is a flow diagram of the hydraulic control circuitry.

The hydraulic system C performs four main functions: (1) opening and closing of the headstock collet; (2) opening and closing of the tailstock collet; (3) movement of the tailstock; and (4) movement of the electrode carrier assembly. These functions are performed through the use of hydraulic pistons which are electromagnetically controlled by solenoid valves. In FIGURE 9 of the drawing, there is shown a schematic diagram of the hydraulic system C. The main components of the hydraulic system C are mounted on a hydraulic pump assembly and a hydraulic panel assembly, generally indicated by the respective reference numerals 100 and 110 and bounded by the dotted line enclosures in FIGURE 9. Contained within the hydraulic pump assembly 100 are an oil reservoir tank 101, a hydraulic pump 102, a manually operable pressure control valve 103, a filter 104, a pressure gauge 105, and an oil cooler 106.

The hydraulic panel assembly 110 contains three solenoid operated hydraulic valves, three check valves, and a metering device. The check valves are identified by the reference numerals 111, 112 and 113. The metering device, generally indicated by the reference numeral 115, includes the parallel combination of a check valve and a control valve. The solenoid operated valves are identified by the reference numerals 117, 118 and 119. Each of the hydraulic valves 117–119 are of the four port type, and are reference coded as follows: The pressure port is designated by the letter P; the return port is designated by the letter R; the line port connected to the rod end of a hydraulic cylinder is identified by the letter X; and, the line port connected to the head end of a hydraulic cylinder is identified by the letter Y. The hydraulic valves 117 and 119 are of the double solenoid, spring-centered, blocked center variety in which all ports are blocked when the solenoids are de-energized. The hydraulic valve 118 is of the single solenoid, spring offset type having its X port externally blocked. The solenoids for the hydraulic valve 117 are identified by the references 121 and 122. Energization of the solenoid 121 causes the interconnection of the ports P and Y of the valve 117, and interconnection of the ports X and R of the valve 117. Energization of the solenoid 122 causes the interconnection of the ports P and X of the valve 117, and the interconnection of the ports Y and R of the valve 117.

The solenoids for the hydraulic valve 119 are identified by the reference numerals 123 and 124. The valve 119 is of identical construction to that of the valve 117. Hence, energization of the solenoid 123 causes the interconnection of the ports P and Y of the valve 119, and the interconnection of the ports X and R of the valve 119. Energization of the solenoid 124 causes the interconnection of the ports P and X of the valve 119, and the interconnection of the ports Y and R of the valve 119.

The solenoid for the hydraulic valve 118 is identified by the reference numeral 125. Energization of the solenoid 125 causes the interconnection of the ports P and Y of the valve 118, and interconnection of the blocked port X with the port R of the valve 118.

The hydraulic system C utilizes two additional solenoid operated hydraulic valves, indicated by the reference numerals 126 and 127. The hydraulic valves 126 and 127 are of the single solenoid, spring offset type, having the outlet port X pressurized when the solenoid is de-energized. The solenoid for the hydraulic valve 126 is identified by the reference numeral 128, and the solenoid for the hydraulic valve 127 is identified by the reference numeral 129. For both of these valves, when the solenoids are de-energized, the ports P and X, and Y and R are interconnected. Energization of the solenoid 128 causes the interconnection of the ports P and Y, and the ports X and R of hydraulic valve 126. Energization of the solenoid 129 causes the interconnection of the ports P and Y, and the ports X and R of the hydraulic valve 127.

The various solenoid operated hydraulic valves 117–119, 126 and 127, are utilized to operate hydraulic cylinders which control the various movements of the tailstock and collets of the lathe A, and the electrode carrier assembly of the seamwelder B. A hydraulic cylinder 130, including a piston head 131 and a piston rod 132, is mounted to the headstock 26 of the lathe A (see FIGURE 2). The projecting end of the piston rod 132 is mechanically coupled by means of a rocker arm 133 to the rod 32 of the headstock collet 30 to enable selective opening and closing of the collet 30 in accordance with changes in the hydraulic pressure within the cylinder 130, as will be explained hereinbelow. A hydraulic cylinder 135, including a piston head 136 and a piston rod 137, is mounted to the tailstock 27 of the lathe A. The projecting end of the piston rod 137 is mechanically coupled by means of a rocker arm 138 to the central rod of the tailstock collet 29, to enable the selective opening and closing of the collet 29 in accordance with changes in the hydraulic pressure within the cylinder 135.

A hydraulic cylinder 140, including a piston head 141 and a piston rod 142, is mounted to the end portion 74 of the mounting bracket 71 of the electrode carrier assembly 60, as is shown in FIGURE 4. The piston rod 142 extends through an aperture in the end portion 74 and is mechanically coupled to the mounting foot 62. Hence, movement of the piston rod 142, in accordance with changes in the hydraulic pressure within the cylinder 140, causes linear movement of the electrode carrier assembly 60 toward and away from the centerline of the collets 29 and 30 of the lathe A.

The hydraulic cylinder 145, including a piston head 146 and a piston rod 147, is mounted to the end of the lathe bed 25 and mechanically coupled with the tailstock 27 to control movement of the tailstock toward and away from the headstock 26.

The solenoids for the various hydraulic valves are wired into the electrical control system D. The electrical control system D will be explained primarily in terms of the various functions which it performs and the interrelationship between the functions, electrical circuit interconnections for the performance of such functions being well known in the art. The electrical control system provides a primary control for the lathe A, the seamwelder B and the hydraulic system C. Power for the welding electrodes is supplied from a 220 v. A.C. service line through welding transformers which provide the low voltage, high current output necessary for the welding operation. The voltage input to the welding transformers is controlled by a variac 151 and the welding transformer outputs, i.e., the welding current, are controlled by an adjustable timer 152. As can be seen in FIGURE 1, the variac 151 and the timer 152 are easily accessible by the operator since they are mounted on the front panel of a cabinet containing the major components of the electrical control system D. FIGURE 1 also shows that the lathe A is enclosed in a dry box 153, the atmosphere within the dry box 153 being maintained relatively devoid of moisture. A microscope 154, mounted to the operating table 155 by means of a pivoted mounting arm 156 enables visual inspection of the subassemblies during the welding operation. The cabinet containing the major components of the electrical control system D, together with the lathe A are mounted to the upper surface of the operating table 155. The hydraulic system C, together with the lathe motor 158, are mounted to the underside of the operating table 155. A foot switch 160 is positioned on the floor beneath the table 155 and connected to the electrical control system by a cable 159.

Figure 8:
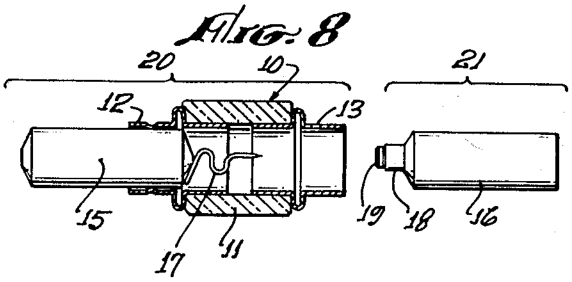
FIGURE 8 is an elevation view, partly in section, of a whisken pin subassembly and a diode pin subassembly which are assembled in the present invention seamwelding apparatus to form a completed semiconductor diode.

Referring now to FIGURE 8 of the drawing, there is shown an exploded view of the components which are assembled into the final semiconductor device. Mounted to the tip of the electrode pin 15 is a cat whisker electrical lead 17. Ohmically bonded to the tip of the electrode pin 16 is a semiconductor crystal 19, the crystal 19 including a PN junction extending transversely of the pin 16. The fabrication of the whisker lead 17 and the semiconductor crystal 19 and their method of attachment to the electrode pins are in accordance with the embodiments disclosed in the hereinabove referenced U.S. Patent No. 2,815,474. In order to facilitate mounting of the components in the lathe, the fused body subassembly 10 is preassembled onto the electrode pin 15, such as by tack welding the metal shell 12 to the pin 15, for example. Additionally, this preassemblage provides protection for the whisker lead 17 during intermediate handling of the electrode pin 15. This preassemblage is termed a whisker pin assembly and is identified by the reference numeral 20. The assemblage consisting of the semiconductor crystal 19 bonded to the electrode pin 16 is termed a diode pin assembly and is identified by the reference numeral 21.

The seamwelder is prepared for operation by manual actuation of a switch which turns on the various power supplies in the electrical control system and actuates the pump in the hydraulic system. The electrical controls system coordinates the various electrical, hydraulic, and mechanical functions of the seamwelder in accordance with the programming of the circuitry of a rotary stepping switch, together with its associated relays. The initial step in the operation of the seamwelder is for the operator to insert the electrode pin 15 of a whisker pin assembly 20 into the open jaws of the chuck 40 of the headstock collet 30. Initial depression of the foot switch 160 causes the stepping switch to advance one position and results in deenergization of solenoid 128. As explained with reference hereinabove to FIGURE 9, de-energization of the solenoid 128 causes hydraulic pressure to be applied to the rod end of the hydraulic cylinder 130, which causes movement of the rod 32 toward the left and sliding of the tapered tip portion 34 to the left to close the headstock collet 30 to rigidly grasp the whisker pin assembly 20. Release of the foot switch 160 causes further advancement of the stepping switch.

Next, the operator places the electrode pin 16 of a crystal pin assembly 21 into the open jaws of the tailstock collet 29, by means of forceps or elongated tweezers. A second depression of the foot switch 160 results in the de-energization of the solenoid 129. When the solenoid 129 is in the de-energized position, hydraulic pressure is applied to the rod end of the hydraulic cylinder 135 to move the piston and piston rod toward the right and to cause closing of the tailstock collet 29 to firmly grasp the crystal pin assembly 21. Upon release of the foot switch 160, the solenoids 124 and 125 are automatically actuated to provide a maximum of hydraulic pressure to the head end of the hydraulic cylinder 145 to begin movement of the tailstock 27 toward the headstock 26. At a certain point during the movement of the tailstock toward the headstock, the lathe motor 158 is automatically actuated to cause synchronous rotation of the headstock and tailstock collets. Subsequently, at a certain point during the advancement of the tailstock collet, a microswitch is mechanically actuated to cause de-energization of the solenoid 126, which results in the interconnection of the ports R and Y of the hydraulic valve 118. However, due to the presence of the check valve 112, the hydraulic valve 118 is effectively removed from the circuit and the hydraulic pressure through the ports P and Y of the hydraulic valve 119 and through the metering device 115 causes movement of the tailstock toward the headstock at a slower rate than before, the rate of slow advance being determined by adjustment of the control valve in the metering device 115.

The tailstock continues its slow rate of advance toward the headstock, and when initial contact between the whisker 17 and the surface of the semiconductor body 19 is achieved, an automatic timing mechanism is actuated which, after expiration of a predetermined period of time, causes automatic de-energization of the solenoid 123 to stop movement of the tailstock. The automatic timing mechanism is adjusted to provide that additional amount of travel, after contact, which results in the desired tensioning of the whisker spring 17 against the semiconductor body 19. A unique feature in the construction of the lathe A is that the headstock and tailstock collets are electrically insulated from each other. Insulation of the lathe collets permits their use as conducting elements in electrical circuitry for sensing of contact between the whisker lead and the semiconductor crystal, and in the welding circuit as will be explained hereinbelow. For sensing of initial contact between the whisker lead 17 and the semiconductor crystal 19, a potential is applied between the headstock and tailstock collets, polarized to cause the flow of forward current through the diode upon completion of the circuit. The beginning of current flow through the diode actuates the automatic timing mechanism to provide the desired amount of tailstock overtravel to tension the whisker lead 17.

Upon de-energization of the solenoid 123, the stepping switch is automatically advanced another step, which in turn causes energization of the solenoid 121. Energization of the solenoid 121 applies hydraulic pressure to the piston head end of the hydraulic cylinder 140, which in turn causes movement of the electrode carrier assembly 60 toward the collets of the lathe. The electrode carrier assembly 60 continues its advance until the cam 97 on the rod 96 mechanically actuates the microswitch 81, actuation of the microswitch 81 causing deenergization of the solenoid 121 to stop the electrode carrier assembly 60 in the position shown in FIGURE 4. With the electrode carrier assembly 60 in the position shown in FIGURE 4, the electrode wheels 85 and the support wheels 89 are almost in contact with the metal shells 12 and 13 of the fused body subassembly 10 held in the lathe. The operator may now adjust the lateral position of the electrode wheels and support wheels with respect to the subassembly 10 so that the weld will occur at the proper points. Since the whisker and pin assemblies are held to close production tolerances, only an initial adjustment of the welding electrode wheels is usually necessary, and many structures may be welded without the necessity of readjustments. Visual inspection is accomplished through use of the microscope 154 which is swung into position and focused upon the subassembly.

When all is in readiness for the welding operation, the operator manually depresses a normally closed welding switch which interrupts the circuit of the microswitch 81 and causes the solenoid 121 to again be energized to permit movement of the electrode carrier assembly 60 into the welding position. As the electrode wheels 85 and the support wheels 89 contact the rotating surfaces of the metal shells 12 and 13, the wheels are forced apart, thereby compressing the helical spring 90. The helical spring 90 is initially adjusted to provide a predetermined tension of the welding electrode wheels and the support wheels against the metal shells. Since the electrode wheels and the support wheels are rotatably mounted, they will be frictionally driven by the rotating shells 12 and 13. Depression of the welding switch also actuates an automatic welding timer which after a predetermined interval causes the flow of welding current. During the predetermined interval, rotation of the fused body subassembly 10 between the wheels of the electrode carrier assembly 60 causes the metal shells 12 and 13 to be spun down into bearing engagement with the electrode pins 15 and 16.

Referring specifically to FIGURE 10 of the drawing, it is seen that the support wheels 89 are spaced slightly closer together than are the electrode wheels 85. Additionally, the electrode wheels 85 are electrically insulated from each other in order that welding current may be first separately applied to the left hand electrode wheel 85 and then subsequently to the right hand welding wheel 85. The closer spacing of the support wheels 89 causes the metal shells 12 and 13 to be compressed down onto the pins 15 and 16 in a peripheral rim spaced slightly closer to the glass cylinder 11 than the point at which welding takes place in order to preclude sputtering into the interior of the glass cylinder 11 and possible contamination of the semiconductor body contained therein. Other relative wheel spacings may occur to those skilled in the art, particularly in the hermetic sealing of encapsulating structures for other types of electrical components such as resistors and capacitors.

There are two welding circuits, each circuit being operated from a separate welding transformer. The welding circuits are selectively actuated by automatic advancement of the stepping switch to connect the output of the variac 151 to the primary winding of the appropriate welding transformer. The secondary winding of one welding transformer is connected between the headstock collet 30 and the welding electrode wheel 85 nearest the headstock collet. The secondary winding of the other welding transformer is connected between the tailstock collet 29 and the welding electrode wheel 85 nearest the tailstock collet (the right hand wheel in the drawings). The two separate welding circuits are possible due to the electrical isolation of the headstock and tailstock collets from each other. Two separate welding circuits are desirable so that each electrode pin may be separately welded to prevent damage to the semiconductor crystal by heat and/or current flow during the welding operation.

After the predetermined time interval has elapsed, during which the metal shells 12 and 13 have been spun down onto the electrode pins 15 and 16, one welding transformer is automatically energized to apply welding current for a predetermined time to the left hand electrode wheel 85. The welding current supplied to the electrode wheel 85 flows through the metal shell 12, the electrode pin 15, and the headstock collet 30. During application of welding, current through the left hand electrode wheel 85 and through the electrode pin 15, the metal shell 12 is welded to the pin 15 in a series of overlapping spot welds. Upon completion of the welding of the whisker pin assembly 20, the other welding transformer is automatically energized and welding current is applied to the right hand electrode wheel 85 to cause welding of the metal shell 13 to the electrode pin 16, the flow of welding current being through the welding wheel 85, the metal shell 13, the pin electrode 16 and the tailstock collet 29. A slight delay is intentionally introduced between the welding of the whisker pin assembly and the crystal pin assembly to allow cooling of the weld by the conduction of heat away from the welding area by the support wheel 89.

Upon completion of the welding of the crystal pin assembly 21, further rotation of the right hand support wheel 89 against the metal shell 13 causes cooling of the weld. Subsequently, the solenoid 122 is automatically energized to cause the application of hydraulic pressure to the piston rod and of the hydraulic cylinder 140 to cause retraction of the electrode carrier assembly 60 away from the collets of the lathe. The electrode carrier assembly then retracts until the cam 97 on the end of the rod 95 actuates the microswitch 82, which in turn causes de-actuation of the solenoid 122 to stop movement of the electrode carrier assembly in a retracted position.

Next, due to further automatic advancement of the stepping switch, the solenoid 123 is automatically energized, thereby applying hydraulic pressure to the head end of the hydraulic cylinder 130, while simultaneously relieving the pressure from the rod end of the cylinder. Hence, actuation of the solenoid 123 causes movement of the rod 32 toward the right to open the jaws of the headstock collet 30. At this point, the solenoid 124 is automatically actuated to cause the application of hydraulic pressure to the piston rod end of the hydraulic cylinder 145, the pressure in the head end of the cylinder being relieved through the check valve in the metering device 115. Hence, energization of the solenoid 124 causes retraction of the tailstock away from the headstock, the completed semiconductor device being held by one end in the jaws of the tailstock collet. During retraction of the tailstock, the lathe motor 158 is automatically de-energized to stop rotation of the headstock and tailstock collets.

Upon reaching a fully retracted position, the solenoid 124 is automatically de-energized to stop movement of the tailstock. Subsequent automatic advancement of the stepping switch then causes energization of the solenoid 129 which causes the application of hydraulic pressure to the head end of the hydraulic cylinder 135 and relief of the pressure from the piston rod end of the cylinder. Hence, actuation of the solenoid 129 causes opening of the tailstock collet, at which time the operator may remove the completed semiconductor device by means of the previously used tweezers. One cycle of operation has now been completed and the stepping switch and associated relays are automatically reset back to the starting position.

In practice, one complete cycle of welding operation can be completed in a few seconds. The physical movements of the operator are the insertion of a whisker pin assembly into the tailstock collet, momentary depression of the foot switch, insertion of a crystal pin assembly into the headstock collet, another momentary depression of the foot switch, swinging of the microscope into place, pressing of the weld button, swinging the microscope back out of the way, and removal of the completed semiconductor device from the jaws of the tailstock collet. Thus, it is seen that upon loading of the device, the entire operation is completely automatic, necessitating only the depression of a foot switch twice and the single depression of a weld switch.

Thus, there has been described an automatic seamwelding apparatus particularly suitable for use in the fabrication of small electrical components wherein electrode pins are hermetically sealed at either end of a tubular encapsulating envelope. A presently preferred embodiment of the seamwelding apparatus has been illustrated and described in conjunction with the fabrication of a semiconductor diode wherein metal electrode pins are coaxially sealed to the ends of a fused body subassembly, the semiconductor crystal body being mounted to an inner end of one of the electrode pins. Due to the localized timed application of heat and the rapid conduction of heat away from the electrode pins by the support wheels, the semiconductor crystal is not heated to a relatively high temperature during the sealing operation. For example, in the specifically illustrated example, the semiconductor crystal temperature does not exceed 250° C., whereas in the various prior art, hermetic sealing processes the crystal body is heated to temperatures on the order of 650° C. and higher.

Although the invention has been described with a certain degree of particularity, it is understood that the present disclosure has been made only by way of example and that changes in the method and in the combination and arrangement of parts used in conjunction with the method may be resorted to without departing from the spirit and the scope of the invention as hereinafter claimed. For example, although the present invention apparatus has been described with reference to the fabrication of a hermetically sealed semiconductor device, the apparatus is equally applicable in the fabrication of other electrical components, both active and passive, wherein it is desired to hermetically seal electrode pins at either end of a tubular encapsulating envelope.

What is claimed is:

1. Apparatus for seamwelding a tubular metallic shell to a metallic electrode pin inserted into an end of said shell, comprising:

(*a*) holding means for maintaining said shell and said electrode pin in mated coaxial alignment on a predetermined axis while synchronously axially rotating said shell and said electrode pin;

(*b*) electrode carrier means including a rotatably mounted welding electrode wheel disposed generally above a rotatably mounted support wheel, said electrode wheel and said support wheel being normally circumferentially spaced apart a distance less than the outer diameter of said shell;

(*c*) means for selectively moving said electrode carrier means normal to said predetermined axis to bring said welding electrode wheel and said support wheel into circumferential pressure contact with said rotating metallic shell; and (*d*) means for selectively applying electrical energy to said welding electrode wheel and said electrode pin while said welding electrode wheel is in circumferential pressure contact with said shell to thereby seamweld said shell to said electrode pin.

2. Apparatus for seamwelding a tubular metallic shell to a metallic electrode pin inserted into an end of said shell, comprising:

(*a*) holding means for maintaining said shell and said electrode pin in mated coaxial alignment on a predetermined axis while synchronously axially rotating said shell and said electrode pin;

(*b*) electrode carrier means including a rotatably mounted welding electrode wheel and a rotatably mounted support wheel, said electrode wheel and said support wheel being urged toward each other with a predetermined force and normally circumferentially spaced apart a distance less than the outer diameter of said shell;

(*c*) means for selectively moving said electrode carrier means normal to said predetermined axis to bring said welding electrode wheel and said support wheel into circumferential engagement with said rotating metallic shell to move said electrode wheel away from said support wheel against said force and cause compression of said shell onto said electrode pin; and (*d*) means for selectively applying electrical energy to said welding electrode wheel and said electrode pin while said welding electrode wheel is in circumferential pressure contact with said shell to thereby seamweld said shell to said electrode pin.

3. Apparatus for seamwelding a first, whisker, pin assembly and a diode pin assembly, said first pin assembly consisting of a first elongate electrode pin having a fused body subassembly mounted to one end thereof with said fused body subassembly including a tubular central glass cylinder fused intermediate first and second tubular metallic shells, comprising in combination:

(*a*) holding means for maintaining said whisker pin assembly and said diode pin assembly in mated coaxial alignment on a predetermined axis while synchronously axially rotating said assemblies;

(*b*) electrode carrier means including a pair of rotatably and insulatively mounted welding electrode wheels, said welding electrode wheels being maintained in spaced apart parallel alignment on a substantially horizontal axis of rotation, said electrode carrier means including a pair of support wheels rotatably mounted in spaced apart parallel alignment generally below said welding electrode wheels and on a substantially horizontal axis of rotation, the spacing between said welding electrode wheels being greater than the length of said tubular glass cylinder but less than the length of said fused body subassembly, the spacing between said support wheels being slightly less than the spacing between said welding electrode wheels;

(*c*) means for selectively moving said electrode carrier means normal to said predetermined axis to bring said welding electrode wheels and said support wheels into circumferential engagement with the metallic shells of a fused body subassembly mounted to said holding means and to compress said shells onto said first and second electrode pins with a predetermined pressure; and, (*d*) means for selectively applying electrical energy to said welding electrode wheels and said electrode pins while said welding electrode wheels are in circumferential pressure contact with said shells to thereby seamweld said shells to said electrode pins.

4. Apparatus for seamwelding a tubular metallic shell to a metallic electrode pin inserted into an end of said shell, comprising:

(*a*) a lathe having a headstock and a tailstock selectively movable toward and away from said headstock, said headstock including a rotatable headstock collet for holding said metallic shell, said tailstock including a rotatable tailstock collet for holding said electrode pin in coaxial alignment with the shell in said headstock collet on a predetermined axis, said lathe including means for synchronously rotating said headstock and tailstock collets;

(*b*) electrode carrier means including a rotatably mounted welding electrode wheel and a rotatably mounted support wheel;

(*c*) means for selectively moving said electrode carrier means normal to said predetermined axis to bring said welding electrode wheel and said support wheel into circumferential engagement with said rotating metallic shell and to compress said shell onto said electrode pin with a predetermined pressure; and, (*d*) means for selectively applying electrical energy to said welding electrode wheel and said tailstock collet while said electrode wheel is in circumferential pressure contact with said shell to cause the flow of welding current through said welding electrode wheel, said shell, said electrode pin and said tailstock collet to thereby seamweld said shell to said electrode pin.

5. Apparatus for seamwelding tubular metallic shells at either end of a tubular subassembly to metal electrode pins inserted into each of said shells, comprising:

(a) a lathe having a headstock and a tailstock selectively movable toward and away from said headstock, said headstock including a rotatable headstock collet, said tailstock including a rotatable tailstock collet coaxially aligned with said headstock collet on a predetermined axis, said lathe including means for synchronously rotating said headstock and tailstock collets;

(b) electrode carrier means including a pair of rotatably and insulatively mounted welding electrode wheels, said welding electrode wheels being maintained in spaced apart parallel alignment on a substantially horizontal axis of rotation, said electrode carrier means also including a pair of support wheels rotatably mounted in spaced apart parallel alignment generally below said welding electrode wheels and on a substantially horizontal axis of rotation, the spacing between said support wheels being slightly less than the spacing between said welding electrode wheels;

(c) means for selectively moving said electrode carrier means normal to said predetermined axis to bring said welding electrode wheels and said support wheels into circumferential engagement with metallic shells disposed on electrode pins mounted to the collets of said lathe and to compress the shells onto the electrode pins with a predetermined pressure; and, (d) means for selectively applying electrical welding energy to said welding electrode wheels and said headstock and tailstock collets while said welding electrode wheels are in circumferential pressure contact with said shells to seamweld said shells to said electrode pins.

6. Apparatus for seamwelding a whisker pin assembly and a diode pin assembly, said whisker pin assembly consisting of a first elongate electrode pin having a spring wire whisker contact mounted to one end thereof and a tubular fused body subassembly mounted to said one end thereof with said whisker contact within the central portion of said fused body subassembly, said fused body subassembly including a tubular central glass cylinder fused intermediate first and second tubular metallic shells, said diode pin assembly consisting of a second elongate electrode pin having a semiconductor crystal diode body mounted to one end thereof, said apparatus comprising, in combination:

(a) a lathe having a headstock and a tailstock selectively movable toward and away from the headstock, said headstock including a rotatable headstock collet, said tailstock including a rotatable tailstock collet, said lathe including means for synchronously rotating said headstock and tailstock collets, said lathe including drive means for selectively moving said tailstock toward and away from said headstock;

(b) electrode carrier means including a pair of rotatably and insulatively mounted welding electrode wheels, said welding electrode wheels being maintained in spaced apart parallel alignment on a substantially horizontal axis of rotation, said electrode carrier means including a pair of support wheels rotatably mounted in spaced apart parallel alignment generally below said welding electrode wheels and on a substantially horizontal axis of rotation, said electrode wheels being normally circumferentially spaced apart from said support wheels a distance less than the outer diameter of said shells, the horizontal spacing between said welding electrode wheels being greater than the length of said tubular glass cylinder but less than the length of said fused body subassembly, the spacing between said support wheels being slight less than the spacing between said welding electrode wheels;

(c) means for selectively moving said electrode carrier means normal to the axis of rotation of the lathe collets to bring said welding electrode wheels and said support wheels into circumferential engagement with the metallic shells of a fused body subassembly mounted to electrode pins held in the lathe collets; and, (d) means for selectively applying electrical energy to said welding electrode wheels and said elongate electrode pins while said welding electrode wheels are in circumferential engagement with said metallic shells to thereby seamweld said shells to said electrode pins.

7. Apparatus for seamwelding a whisker pin assembly and a diode pin assembly, said whisker pin assembly consisting of a first elongate electrode pin having a spring wire whisker contact mounted to one end thereof and a tubular fused body subassembly mounted to said one end thereof with said whisker contact within the central portion of said fused body subassembly, said fused body subassembly including a tubular central glass cylinder fused intermediate first and second tubular metallic shells, said diode pin assembly consisting of a second elongate electrode pin having a semiconductor crystal diode body mounted to one end thereof, said apparatus comprising, in combination:

(a) a lathe having a headstock and a tailstock selectively movable toward and away from the headstock, said headstock including a rotatable headstock collet for holding said whisker pin assembly with the other end of said first elongate electrode pin inserted in said headstock collet, said tailstock including a rotatable tailstock collet for holding said diode pin assembly with the other end of said second elongate electrode pin being inserted in said tailstock collet, said lathe including means for synchronously rotating said headstock and tailstock collets;

(b) drive means coupled to said lathe for selectively moving said tailstock toward said headstock until said semiconductor crystal diode body mounted to the end of said elongate electrode pin makes contact with the projecting end of said spring wire whisker contact mounted to the end of said first elongate electrode pin within said tubular fused body subassembly and then advancing said tailstock a predetermined distance further toward said headstock to bend said spring wire whisker contact to bias it against said semiconductor crystal diode body with a predetermined spring force;

(c) electrode carrier means including a pair of rotatably and insulatively mounted welding electrode wheels, said welding electrode wheels being maintained in spaced apart parallel alignment on a substantially horizontal axis of rotation, said electrode carrier means including a pair of support wheels rotatably mounted in spaced apart parallel alignment generally below said welding electrode wheels and on a substantially horizontal axis of rotation, the spacing between said welding electrode wheels being greater than the length of said tubular glass cylinder but less than the length of said fused body subassembly, the spacing between said support wheels being slightly less than the spacing between said welding electrode wheels;

(d) means for selectively moving said electrode carrier means normal to said predetermined axis to bring said welding electrode wheels and said support wheels into circumferential engagement with the metallic shells of a fused body subassembly mounted to the headstock collet of said lathe and to compress said shells onto said first and second electrode pins with a predetermined pressure; and, (e) means for selectively applying electrical energy to said welding electrode wheels and said elongate electrode pins while said welding electrode wheels are in circumferential pressure contact with said shells to thereby seamweld said shells to said electrode pins.

8. Apparatus for seamwelding a whisker pin assembly and a diode pin assembly, said whisker pin assembly consisting of a first elongate electrode pin having a spring wire whisker contact mounted to one end thereof and a tubular fused body subassembly mounted to said one end thereof with said whisker contact within the central portion of said fused body subassembly, said fused body subassembly including a tubular central glass cylinder fused intermediate first and second tubular metallic shells, said diode pin assembly consisting of a second elongate pin having a semiconductor crystal diode body mounted to one end thereof, said apparatus comprising, in combination:

(*a*) a lathe having a headstock and a tailstock selectively movable toward and away from the headstock, said headstock including a rotatable headstock collet for holding said whisker pin assembly with the other end of said first elongate electrode pin inserted in said headstock collet, said tailstock including a rotatable tailstock collet for holding said diode pin assembly with the other end of said second elongate electrode pin being inserted in said tailstock collet, said lathe including means for synchronously rotating said headstock and tailstock collets;

(*b*) drive means coupled to said lathe for selectively moving said tailstock toward said headstock until said semiconductor crystal diode body mounted to the end of said elongate electrode pin makes contact with the projecting end of said spring wire whisker contact mounted to the end of said elongate electrode pin within said tubular fused body subassembly, and then advancing said tailstock a predetermined distance further toward said headstock to bend said spring wire whisker contact to bias it against said semiconductor crystal diode body with a predetermined spring force;

(*c*) electrode carrier means including first and second rotatably and insulatively mounted welding electrode wheels, said welding electrode wheels being maintained in spaced apart parallel alignment on a substantially horizontal axis of rotation, said electrode carrier means including first and second support wheels rotatably mounted in spaced apart parallel alignment generally below said welding electrode wheels and on a substantially horizontal axis of rotation, the spacing between said first and second welding electrode wheels being greater than the length of said tubular glass cylinder but less than the length of said fused body subassembly, the spacing between said first and second support wheels being slightly less than the spacing between welding electrode wheels, said first electrode wheel and said first support wheel being urged toward each other with a predetermined spring force and normally circumferentially spaced apart a distance less than the outer diameter of said shells, said second electrode wheel and said second support wheel being urged toward each other with a predetermined spring force and normally circumferentially spaced apart a distance less than the outer diameter of said shells;

(*d*) means for selectively moving said electrode carrier means normal to said predetermined axis to bring said welding electrode wheels and said support wheels into circumferential engagement with the metallic shells of a fused body subassembly mounted between the collets of said lathe to move said first and second electrode wheels away from said first and second support wheels against said spring force and cause compression of said shells onto said electrode pins; and, (*e*) means for selectively applying electrical energy to said welding electrode wheels and said elongate electrode pins while said welding electrode wheels are in circumferential pressure contact with said shells to thereby seamweld said shells to said electrode pins.

9. Apparatus for seamwelding a whisker pin assembly and a diode pin assembly, said whisker pin assembly consisting of a first elongate electrode pin having a spring wire whisker contact mounted to one end thereof and a tubular fused body subassembly mounted to said one end thereof with said whisker contact within the central portion of said fused body subassembly, said fused body subassembly including a tubular central glass cylinder fused intermediate first and second tubular metallic shells, said diode pin assembly consisting of a second elongate electrode pin having a semiconductor crystal diode body mounted to one end thereof, said apparatus comprising, in combination:

(*a*) a lathe having a headstock and a tailstock selectively movable toward and away from the headstock, said headstock including a rotatable headstock collet for holding said whisker pin assembly with the other end of said first elongate electrode pin inserted in said headstock collet, said tailstock including a rotatable tailstock collet for holding said diode pin assembly with the other end of said second elongate electrode pin being inserted in said tailstock collet, said lathe including means for synchronously rotating said headstock and tailstock collets;

(*b*) drive means coupled to said lathe for selectively moving said tailstock toward said headstock until said semiconductor crystal diode body mounted to the end of said elongate electrode pin makes contact with the projecting end of said spring wire whisker contact mounted to the end of said first elongate electrode pin within said tubular fused body subassembly, and then advancing said tailstock a predetermined distance further toward said headstock to bend said spring wire whisker contact to bias it against said semiconductor crystal diode body with a predetermined spring force;

(*c*) electrode carrier means including first and second rotatably and insulatively mounted welding electrode wheels, said welding electrode wheels being maintained in spaced apart parallel alignment on a substantially horizontal axis of rotation, said electrode carrier means including first and second support wheels rotatably mounted in spaced apart parallel alignment on a substantially horizontal axis of rotation with said first support wheel being disposed generally below said first electrode wheel and with said second support wheel being disposed generally below said second electrode wheel, the spacing between said first and second welding electrode wheels being greater than the length of said tubular glass cylinder but less than the length of said fused body subassembly, the spacing between said first and second support wheels being slightly less than the spacing between said welding electrode wheels;

(*d*) means for selectively moving said electrode carrier means normal to said predetermined axis to bring said welding electrode wheels and said support wheels into circumferential engagement with the metallic shells of a fused body subassembly mounted to the headstock collet of said lathe and to compress said shells onto said first and second electrode pins with a predetermined pressure; and, (*e*) means for selectively sequentially applying electrical energy between said first welding electrode wheel and said headstock collet and between said second welding electrode wheel and said tailstock collet while said welding electrode wheels are in circumferential pressure contact with said shells to thereby seamweld one shell of the subassembly to the electrode pin mounted in the headstock collet and then seamweld the other shell to the electrode pin mounted in the tailstock collet.

(References on following page)

References Cited by the Examiner

UNITED STATES PATENTS

| | | | |
|---|---|---|---|
| 812,969 | 2/06 | Winfield | 219—81 |
| 977,711 | 12/10 | Craven | 219—83 |
| 1,601,927 | 10/26 | Tobey | 219—81 |
| 1,982,850 | 12/34 | Banks | 29—148.2 |
| 2,251,324 | 8/41 | Carlson | 219—124 |
| 2,347,185 | 4/44 | Fentress | 219—83 |
| 2,766,369 | 10/56 | Sachsteder | 219—81 |

RICHARD M. WOOD, *Primary Examiner*.